(12) United States Patent
Heikkila et al.

(10) Patent No.: US 7,916,201 B2
(45) Date of Patent: Mar. 29, 2011

(54) MOBILE DEVICE, METHOD AND COMPUTER PROGRAM PRODUCT FOR DISPLAYING IMAGES ON A DISPLAY SCREEN

(75) Inventors: Paivi Heikkila, Tampere (FI); Sanna Lindroos, Valkeakosiki (FI)

(73) Assignee: Nokia Corporation, Espoo (FI)

( * ) Notice: Subject to any disclaimer, the term of this patent is extended or adjusted under 35 U.S.C. 154(b) by 532 days.

(21) Appl. No.: 11/278,319

(22) Filed: Mar. 31, 2006

(65) Prior Publication Data

US 2007/0236575 A1    Oct. 11, 2007

(51) Int. Cl.
*H04N 5/222* (2006.01)

(52) U.S. Cl. ................ 348/333.05; 348/231.2

(58) Field of Classification Search ............. 348/207.99, 348/231.2, 333.05, 333.11, 211.99, 333.01–333.13; 396/177, 287; 455/556.1, 557
See application file for complete search history.

(56) References Cited

U.S. PATENT DOCUMENTS

| | | | | |
|---|---|---|---|---|
| 5,899,587 A * | 5/1999 | Itabashi et al. | ................ | 396/177 |
| 6,147,703 A * | 11/2000 | Miller et al. | ................ | 348/220.1 |
| 6,308,084 B1 * | 10/2001 | Lonka | ................ | 455/556.1 |
| 6,437,797 B1 * | 8/2002 | Ota | ................ | 345/638 |
| 6,657,666 B1 * | 12/2003 | Imagawa et al. | ......... | 348/333.02 |
| 6,819,356 B1 * | 11/2004 | Yumoto | ................ | 348/231.2 |
| 6,943,841 B2 * | 9/2005 | Miyake et al. | ......... | 348/333.05 |
| 7,171,113 B2 * | 1/2007 | Parulski et al. | ................ | 396/287 |
| 7,196,722 B2 * | 3/2007 | White et al. | ............. | 348/211.99 |
| 7,196,727 B2 * | 3/2007 | Sato | ................ | 348/333.11 |
| 2001/0015756 A1 * | 8/2001 | Wilcock et al. | ................ | 348/158 |
| 2002/0171737 A1 * | 11/2002 | Tullis | ................ | 348/143 |
| 2004/0071285 A1 * | 4/2004 | Satoh et al. | ................ | 379/419 |
| 2005/0231611 A1 * | 10/2005 | Anderson et al. | ......... | 348/231.2 |
| 2005/0264984 A1 * | 12/2005 | Lee | ................ | 361/681 |

* cited by examiner

*Primary Examiner* — Lin Ye
*Assistant Examiner* — Dennis Hogue
(74) *Attorney, Agent, or Firm* — Alston & Bird LLP

(57) ABSTRACT

A mobile device, method and computer program product are provided for displaying a predefined subset of images captured on a display screen of a mobile device, thus eliminating the need to access a gallery, or image storage, application installed on the mobile device and, in some instances, open the mobile device, in order to view recently captured images. In particular, a user is able to define the subset of the images to be displayed as, for example, all images taken within the last day, week, month or even year, or all images taken at a certain location or at the location corresponding with the most recently captured image. Depending upon how the user has defined the subset, the mobile device will automatically update the subset of images displayed based upon the occurrence of various events (e.g., where the oldest picture of the subset was taken more than one day ago).

39 Claims, 3 Drawing Sheets

MOBILE DEVICE, METHOD AND COMPUTER PROGRAM PRODUCT FOR DISPLAYING IMAGES ON A DISPLAY SCREEN

FIELD

Exemplary embodiments of the present invention relate, generally, to images captured using a mobile device and, more particularly, to displaying those images on an outside display screen of the mobile device.

BACKGROUND

More and more mobile devices, such as cellular telephones, personal digital assistants (PDAs), pagers, and the like, are being used for purposes other than those for which they were originally intended. Cell phones are no longer being used merely to call people. By contrast, these mobile devices are being equipped with the necessary hardware and software to perform functions, such as, sending emails, text messaging and/or browsing the Internet.

As part of this trend, many mobile devices are also being used to capture, store, and share images, such as still photographs and even video clips. In particular, many mobile devices function much like digital cameras enabling their users to take pictures (still or video) and to view digital images of the pictures taken. In addition, gallery, or image storage, applications are often installed on the mobile device enabling the mobile device user to store, categorize, view and even send images captured using his or her mobile device.

One drawback to many such mobile devices, however, is that while images can be captured while the mobile device is in closed mode (i.e., where the flap or cover of a flip-phone or similar mobile device is closed), and, in some instances, the latest image captured can be viewed while the mobile device remains in closed mode, the remaining images captured (i.e., all images stored using the image storage or gallery application) can only be viewed upon opening the mobile device (i.e., putting the mobile device in open mode by, for example, opening the cover or flap of a flip-phone or similar mobile device).

Often times an individual will take several pictures (or otherwise capture several images) sequentially prior to opening the mobile device in order to check the pictures and, where desired, delete those images for which the individual does not care. Requiring that the individual open the mobile device and, in many instances, change the orientation of the mobile device, in order to view the sequentially captured images can be quite tedious.

In addition to the foregoing, another drawback to many mobile devices is the fact that the gallery, or image storage, application used to store, view and manipulate captured images will often be required to download all of the stored images prior to displaying only those most recently captured images. Where, as is often the case, a user only wishes to view the most recently captured images, this requirement unnecessarily slows down the viewing process. The process is further slowed by the numerous available features of many gallery applications (e.g., cropping, transmitting, saving in specific folders, etc.), which too are often not used by individuals seeking only to view recently captured images. This drawback exists regardless of whether the mobile device displays images only when in open mode (i.e., where the mobile device comprises a flip-phone, or similar device), or is always in open mode (i.e., where the mobile device does not include a flap or a cover).

A need, therefore, exists for an improved technique for viewing images captured using a mobile device.

BRIEF SUMMARY

In general, exemplary embodiments of the present invention provide an improvement over the known prior art by, among other things, providing a technique for viewing a predefined subset of images captured (e.g., the most recently captured images). In particular, exemplary embodiments of the present invention enable a user of a mobile device to define the subset of the images captured that will be displayed on the display screen. The user may, for example, define the subset of images displayed as all images taken within the last day, week or month. Alternatively, the user may define the subset of images displayed as all images taken at a certain location or at the location corresponding with the most recently captured image. The user may further define the subset as the last X pictures captured, wherein X is some integer value, such as 10 or 20. Depending upon how the user has defined the subset, the mobile device will first select the images to be displayed and then automatically update the subset of images displayed on the display screen based upon the occurrence of various events (e.g., where the oldest picture of the subset was taken more than one day ago, or where the addition of the latest image captured would result in the number of images of the subset exceeding X). In one exemplary embodiment, the subset of images is displayed on an outside display screen located on or viewable through the outside cover of the mobile device (i.e., where the mobile device comprises a flip-phone or similar device, discussed below).

In accordance with one aspect of the invention, a mobile device is provided that is capable of displaying a subset of captured images on a display screen of the mobile device. In one exemplary embodiment the mobile device includes a camera capable of capturing a plurality of images and a display screen capable of displaying at least the subset of the plurality of images captured. The mobile device of this exemplary embodiment further includes a processor in communication with the camera and the display screen and a memory in communication with the processor that stores an application executable by the processor, wherein the application is configured, upon execution, to: (1) select a subset of the plurality of images captured; (2) to automatically display the subset of images selected on the display screen; and (3) to automatically update the subset of images displayed in response to the occurrence of one or more events.

According to another aspect of the invention, a method is provided of displaying a subset of captured images on a display screen of a mobile device. In one exemplary embodiment, the method includes: (1) enabling a user associated with the mobile device to capture a plurality of images; (2) selecting a subset of the plurality of images captured; (3) automatically displaying the subset of images selected on a display screen of the mobile device; and (3) automatically updating the subset of images displayed in response to the occurrence of one or more events.

In accordance with yet another aspect of the invention a computer program product is provided for displaying a subset of captured images on a display screen of a mobile device. The computer program product contains at least one computer-readable storage medium having computer-readable program code portions stored therein. The computer-readable program code portions of one exemplary embodiment include: (1) a first executable portion for enabling a user associated with the mobile device to capture a plurality of images; (2) a second executable portion for selecting a subset of the plurality of images captured; (3) a third executable portion for automatically displaying the subset of images selected on a display screen of the mobile device; and (4) a fourth executable portion for automatically updating the subset of images displayed in response to the occurrence of one or more events.

According to another aspect of the invention, an apparatus is provided for displaying a subset of captured images. In one exemplary embodiment, the apparatus includes a processor and a memory, wherein the memory stores an application executable by the processor. The application of this exemplary embodiment may be configured, upon execution, to: (1) select a subset of images from a plurality of images captured; (2) cause the subset of images to be displayed; and (3) cause the subset of images displayed to be automatically updated in response to the occurrence of one or more events.

According to yet another aspect of the invention, a system is provided. In one exemplary embodiment, the system includes: (1) a means for selecting a subset of images from a plurality of images captured; (2) a means for displaying the subset of images selected; and (3) a means for automatically updating the subset of images displayed in response to the occurrence of one or more events.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
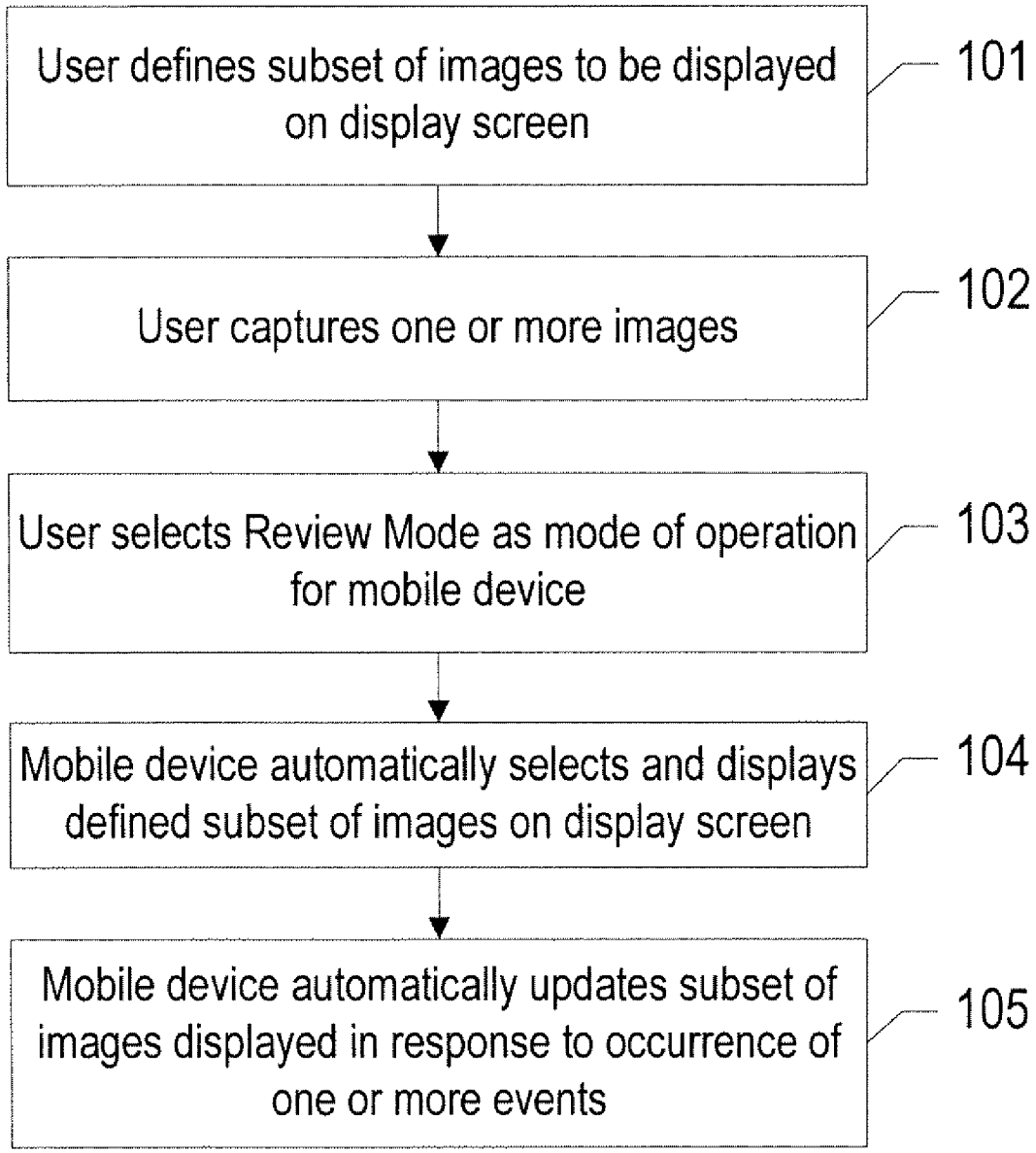
FIG. 1 is a flow chart illustrating the steps which may be taken in order to display a subset of images captured on a display screen of a mobile device in accordance with exemplary embodiments of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a mobile device, method and computer program product for displaying a subset of captured images on a display screen of a mobile device, wherein the subset may include all or, as is typically the case, less than all of the captured images. In one exemplary embodiment, the display screen is located on or viewable through the outside cover of the mobile device. In particular, many mobile devices (e.g., cellular telephones) include two basic components, a body of the device and a flap or cover. The body of the device often includes components, such as, a keypad, an inside display screen and a voice receiver into which an individual can speak. The flap or cover of the device often includes a speaker on one side, referred to herein as the "inside," from which an individual can hear, for example, another individual speaking, downloaded music, and the like. In addition, the opposite side of the flap or cover, referred to herein as the "outside" of the mobile device, often includes an outside display screen, which may be used, for example, to display the name and/or number of an individual calling the user associated with the mobile device (i.e., to provide caller identification (ID) functionality). In an alternative embodiment, the flap or cover may define a hole or cutout that enables the "inside" display screen to be viewable even when the flap or cover is closed (as that term is defined below). In this instance, the inside display screen located on the body of the mobile device would, in effect, be comparable to an outside display screen located on the outside cover of the mobile device, since the display screen would be viewable while the device is closed. As use herein, therefore, the term "outside" refers to a display screen that is configured to be viewable from the outside of the mobile device when the device is closed, regardless of the display screen's physical location (i.e., regardless of whether the display screen is on the body of a mobile device having a hole or cutout in the flap or cover, or on the outside of the flap).

In order to "close" a mobile device including these two components, the flap or cover may be "flipped" toward the body, so that the inside of the flap or cover is in direct contact with the body of the mobile device. While closed, the keypad, speaker and inside display screen of the body are no longer visible, while the outside display screen remains so.

As noted above, in many instances an individual will capture a sequence of images using his or her mobile device while the mobile device is closed (i.e., while the flap or cover of the device is down). While many mobile devices will enable the user to view the latest image captured on the outside display screen, in order to view any other images, he or she is forced to open the mobile device in order to expose the inside display screen. Using, for example, the keypad, the user can then access the gallery, or image storage, application, which will download all images captured by the individual and display them on the inside display screen. This process is both inconvenient and time consuming, since in many instances the user may only wish to quickly view the most recently captured images. Because the gallery application downloads all of the pictures and includes functionality to enable the user to not only view the images, but manipulate them (e.g., crop, zoom, etc.), send them to other people, organize them into folders, and the like, the application may be quite slow. While these added features are beneficial, the effect the added features have on the processing time may be very frustrating where the user only desires to quickly view recently captured images and, in some instances, delete those that he or she does not care for.

Exemplary embodiments of the present invention provide an improvement over the above-referenced situation, by enabling a user to define a subset of images that will be displayed on the display screen of his or her mobile device. In one exemplary embodiment (i.e., where the mobile device comprises a flip-phone or similar device), the images are displayed on the outside display screen, thus eliminating the need to open the mobile device or to access the gallery application. In an alternative exemplary embodiment (i.e., where the mobile device does not include a flap or cover and is, therefore, always in "open mode"), the images are displayed on the main display screen, yet are still viewable without accessing the gallery application. The user may, for example, define the subset as a specific number of the latest images captured. Alternatively, he or she may define the subset as all images captured in the last day, week or month. In yet another exemplary embodiment, the user may define the subset as all images captured at a specific location. The location may be one of particular interest to the user (e.g., from his or her vacation to Italy), or it may be all pictures taken at the location of the most recently taken picture. To illustrate, an individual may take a sequence of pictures at his or her office. While he or she is taking pictures at the office, and until he or she takes a picture elsewhere, all pictures taken at the office will be viewable without accessing the gallery application and, in exemplary embodiment, on the outside display screen (i.e., the user will be capable of browsing through those pictures without opening the mobile device). If the user then travels to a bar, or some other location, for happy hour and begins taking pictures there, the pictures taken at the bar will replace the pictures taken at the office as the subset of pictures viewable on the display screen.

In addition to being more convenient, because the number of pictures displayed on the outside display screen and the functionality available to the user for manipulating those images are limited (i.e., the user may only be able to view and delete the images using the outside display screen), exemplary embodiments of the present invention provide for quicker viewing possibilities. As a result, exemplary embodiments enable the user to quickly take, view and retake pictures without reorienting the mobile device and possibly losing precious time needed to get the perfect picture.

Method of Displaying Recently Captured Images on an Outside Display Screen:

Reference is now made to FIG. 1, which illustrates the steps which may be taken in order to display a subset of images captured on a display screen of a mobile device in accordance with exemplary embodiments of the present invention. As shown, the process begins at Step 101 where the user defines the subset of images to be displayed on the outside display screen. As discussed above, in one exemplary embodiment, this involves the user selecting from among a list of parameters or rules including, for example, all images captured within the last day, week or month, or all images captured in a location associated with a most recently captured image. Alternatively, the user may specify that the subset of images should include X images captured, wherein X is some integer value, such that the X (e.g., 10) most recently captured images will be displayed. In yet another exemplary embodiment, the user may specify that all images that he or she has captured but has yet to view should be included in the subset of images displayed on the outside display screen. Alternatively, where the user does not define the subset, a default set of parameters may be used for defining the subset. For example, the mobile device may automatically display the 15 most recently captured images, unless the user specifies otherwise.

In general, images captured by a mobile device will have metadata (i.e., data about data) associated therewith that indicates, for example, on what day and at what time the image was captured, where the image was captured and by whom the image was captured. As will be recognized by those of ordinary skill in the art, information regarding where and when the image was captured may be ascertained using any number of contextual applications including, for example, Global Positioning System (GPS)-related applications. In one exemplary embodiment, the metadata is used by the mobile device to select the subset of images displayed on the mobile device display screen as specified by the mobile device user.

Once the user has defined the subset of images to be displayed, he or she may then begin capturing one or more images using the mobile device (Step 102). Images captured may include, for example, still photographs or even video clips. Once a number of images have been captured, in order to view the defined subset of images on the display screen, the user selects Review Mode as the mode of operation of the mobile device. (Step 103). In particular, the user may depress a key on the mobile device keypad or a button or switch, for example, on the side of the mobile device that corresponds with the Review Mode. Alternatively, selecting the Review Mode may involve highlighting and selecting an icon displayed on either the outside or inside display screen (assuming the mobile device has both) that corresponds with the Review Mode. As one of ordinary skill in the art will recognize, any number of methods or means may be used for selecting the Review Mode of operation without departing from the spirit and scope of the present invention, and the above methods of doing so are provided for exemplary purposes only and should not be seen as limiting the scope of the present invention.

In addition, as one of ordinary skill in the art will recognize, the order of performing Steps 101, 102 and 103 is not limited to that described above. For example, a user may capture a plurality of pictures prior to defining the subset to be displayed on the display screen. The user may further put the device in Review Mode prior to, or at any point during, capturing the pictures.

Regardless of the foregoing, once the mobile device has been placed in Review Mode, the defined subset of images is selected (i.e., by the mobile device, for example, based on the user defined parameters) and displayed on the display screen in Step 104, without the user needing to access the gallery application of the mobile device. In particular, in one exemplary embodiment, the most recently captured image is displayed on the display screen, and the user is then able to browse through the other images of the subset in order of the most recently captured image to the oldest image of the subset. Alternatively, the images may be browsed from the oldest to the most recently captured. Just as the user was able to define what images were included in the subset, he or she may similarly be able to define in what order and how the images are displayed and capable of being browsed through.

In addition to being able to browse through the images of the subset of images displayed, a user may, in one exemplary embodiment, be able to delete those images for which he or she does not care. Other similar functionality (e.g., cropping, zooming, etc.), may likewise be provided. However, in order to maintain speed and simplicity, in one exemplary embodiment, the functionality that is provided via the review mode remains limited to only certain select functions, such as the most essential functions, at least as compared to that provided by the gallery, or image storage, application. As noted above, one of the drawbacks of the gallery application is that it may be burdensome where an individual merely wishes to view the latest images captured, since the extra features of the application (i.e., other than just viewing the images, e.g., organizing, sending, etc.) can slow down the viewing process. As discussed above, in one exemplary embodiment, Step 104 may involve displaying the subset of images on the outside display screen located on or viewable through the outside cover of the mobile device, thus also eliminating the need for the user to open the mobile device. Alternatively, where the mobile device does not have an outside cover or an outside display screen and, therefore, does not need to be opened, Step 104 may involve displaying the images on the main display screen of the mobile device.

Finally, in Step 105, the mobile device automatically updates the subset of images displayed on the display screen in response to the occurrence of one or more events. In particular, where, for example, a user has defined the subset of images displayed as all images captured in the last 24 hours, the mobile device will automatically remove images from the subset where the time on which those images were captured (as determined, for example, based on the aforementioned metadata associated with the captured image) is more 24 hours from the present time. As another example, where the user has defined the subset of images as including a predetermined number of the most recent (e.g., 10) images captured, the mobile device will replace the oldest image of the subset with the most recently captured image, where the number of images in the subset has reached the predetermined number. In yet another example, as discussed above, where the user has defined the subset as all images captured at the location associated with the most recently captured image, the mobile device will automatically replace all of the images in the subset that are associated with one location (e.g., the office) with newly captured images that are associated with a different location (e.g., the bar). In particular, where the location (e.g., the GPS position) of the last image captured, as indicated, for example, by the metadata associated with that image, differs from the location or GPS position associated with the previous image(s) captured, the mobile device will replace the previous image(s) with the newest image.

According to exemplary embodiments of the present invention, therefore, a user is able to easily and quickly view a defined subset of the images he or she has captured using his or her mobile device without being required to open the mobile device or to access the gallery application installed on the mobile device.

Figure 2:
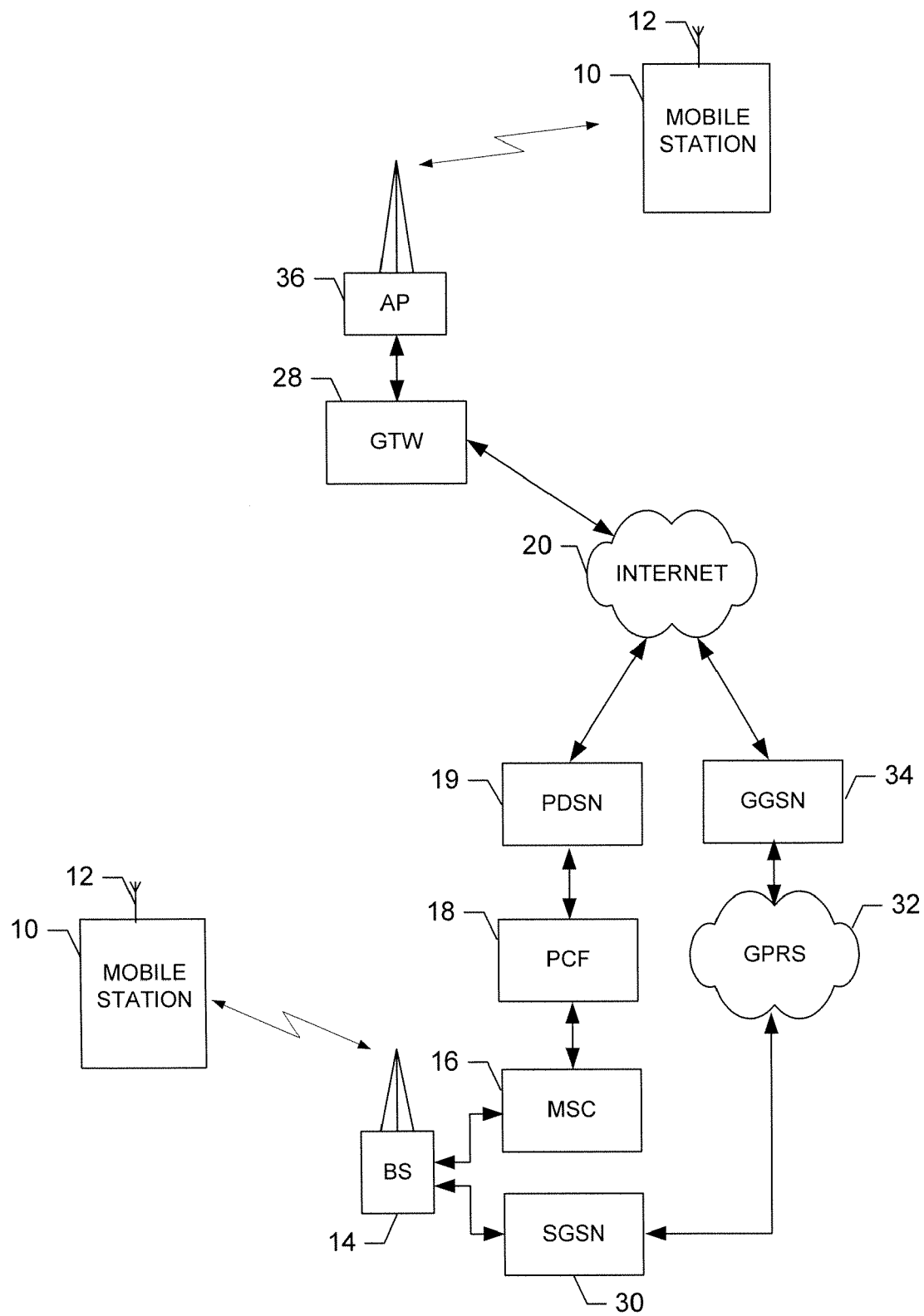
FIG. 2 is a block diagram of one type of system that would benefit from exemplary embodiments of the present invention.

Overall System and Mobile Device:

Referring to FIG. 2, an illustration of one type of system that would benefit from exemplary embodiments of the present invention is provided. As shown in FIG. 2, the system can include one or more mobile devices or stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the mobile station 10 via the Internet. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, such as computing or other devices capable of establishing communication via an access point, although not shown as such in FIG. 2) can further be coupled to one or more wireless access points (APs) 36. The APs can be configured to communicate with the mobile station in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 16, the APs can be directly coupled to the Internet. In one embodiment, however, the APs are indirectly coupled to the Internet via a GTW 28. As will be appreciated, by directly or indirectly connecting the mobile stations and the processing elements and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile stations 10 to one another and/or to one or more processing elements across the Internet 20, one or more such entities may be directly coupled to one another. As such, one or more network entities may communicate with one another in accordance with, for example, RF, BT, IrDA or any of a number of different wireline or wireless communication techniques, including LAN and/or WLAN techniques. Further, the mobile station 10 and the processing elements can be coupled to one or more electronic devices, such as printers, digital projectors and/or other multimedia capturing, producing and/or storing devices (e.g., other terminals).

Figure 3:
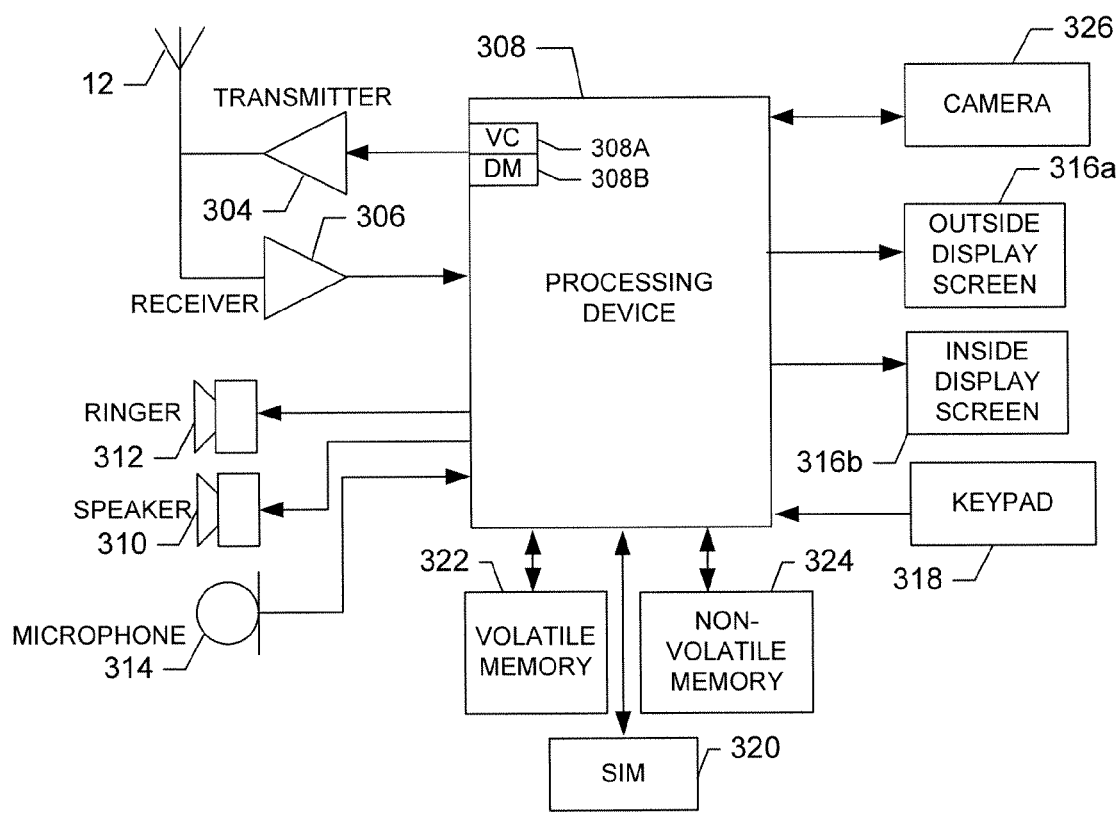
FIG. 3 is a schematic block diagram of a mobile station capable of operating in accordance with an exemplary embodiment of the present invention.

Reference is now made to FIG. 3, which illustrates one type of electronic device that would benefit from embodiments of the present invention. As shown, the electronic device may be a mobile device or station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 3, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, or application specific integrated circuit (ASIC) or other integrated circuit, includes the circuitry required for implementing the video, audio, and logic functions of the mobile station and is capable of executing application programs for implementing the functionality discussed herein. For example, the processing device 308 may include the necessary circuitry for communicating with a camera 326 or camera element included in the mobile station 10 and configured to capture images (e.g., still photographs or video clips) in accordance with exemplary embodiments of the present invention and, in particular, in accordance with Step 102 of FIG. 1 discussed above. In particular, the processing device may, for example, be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, an outside display screen 316a, and/or an inside display screen 316b (as discussed above), all of which are coupled to the controller 308. The user input interface allows the mobile device to receive data, such as the parameters defining the subset of images to be displayed (in accordance with Step 101 of FIG. 1 discussed above), and/or the selection of the Review Mode by a user (in accordance with Step 103 of FIG. 1). The user input interface can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for selecting a subset of the plurality of images captured using the mobile device camera 326 to be displayed on the outside and/or the inside display screen 316a, 316b, for example, based on the parameters defined by the user, and for automatically displaying the subset of images selected, on the display screen (in accordance with Step 104 of FIG. 1 discussed above). The memory may further store computer program code for automatically updating the subset of images displayed in response to the occurrence of one or more events (in accordance with Step 105 of FIG. 1).

The mobile device, method and computer program product of exemplary embodiments of the present invention are primarily described in conjunction with mobile communications applications. It should be understood, however, that the mobile device, method and computer program product of embodiments of the present invention can be utilized in conjunction with a variety of other applications, both in the mobile communications industries and outside of the mobile communications industries. For example, the mobile device, method and computer program product of exemplary embodiments of the present invention can be utilized in conjunction with wireline and/or wireless network (e.g., Internet) applications.

Conclusion:

As described above and as will be appreciated by one skilled in the art, embodiments of the present invention may be configured as a mobile device or method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile device comprising:
    a first display screen configured such that the first display screen is not viewable while the mobile device, that is configured to alternatively assume an open position or a closed position, is in the closed position;
    a second display screen configured to be viewable and display at least a subset of a captured plurality of images while the mobile device is in the closed position; and
    a memory in communication with a processor, said memory being configured to store an application executable by the processor, wherein the application is configured, upon execution,
        to select a subset of the plurality of images captured, the subset being defined as images captured at a location associated with a most recently captured image as indicated by a positioning system,
        to facilitate an automatic displaying of the subset of images selected on the second display screen, and
        to facilitate the automatic updating of the subset of images displayed in response to the occurrence of one or more events, wherein the occurrence of one or more events includes determining that the location associated with the most recently captured image differs from a location associated with a previously captured image.

2. The mobile device of claim 1, wherein the application is further configured, upon execution, to enable selection from one or more modes of operation of the mobile device, said modes comprising at least a review mode.

3. The mobile device of claim 2, wherein facilitating the automatic displaying of the subset of images comprises facilitating the automatic displaying of the subset of images in response to selection of the review mode.

4. The mobile device of claim 3 further comprising:
    a keypad comprising a plurality of keys capable of being actuated, at least one of the keys corresponding with the review mode, wherein selecting the review mode comprises actuating the corresponding key.

5. The mobile device of claim 3, wherein selecting the review mode comprises selecting an icon displayed on the second display screen and corresponding with the review mode.

6. The mobile device of claim 1, wherein the application is further configured, upon execution, to enable definition of the subset of images displayed on the second display screen, said application further configured, upon execution, to select the subset of the plurality of images captured based at least in part on a definition of the subset.

7. The mobile device of claim 1, wherein respective images of the plurality of images captured have a corresponding date and time associated therewith.

8. The mobile device of claim 1, wherein being configured to facilitate automatic updating of the subset of images displayed in response to the occurrence of one or more events comprises being configured to facilitate automatic updating of the subset of images where a location associated with a latest image captured differs from a location associated with a previously captured image, such that all images of the subset of images displayed have the same corresponding location associated therewith.

9. The mobile device of claim 1, wherein being configured to facilitate automatic updating of the subset of images displayed in response to the occurrence of one or more events comprises being configured to replace the oldest image captured with a newly captured image when a number of images in the subset reaches a predefined limit.

10. The mobile device of claim 1, wherein the application is further configured, upon execution, to enable the subset of images displayed on the second display screen to be browsed.

11. The mobile device of claim 1 further comprising a body and a movable cover, and wherein the mobile device is in the closed position when an inside surface of the movable cover, upon which the first display is disposed, is in contact with the body.

12. The mobile device of claim 11, wherein the second display screen is affixed to an outside surface of the movable cover.

13. A method comprising:
  selecting a subset of a plurality of images captured, the subset being defined as images captured at a location associated with a most recently captured image as indicated by a positioning system;
  facilitating an automatic displaying of the subset of images selected on a second display screen of a mobile device while the mobile device, that is configured to alternatively assume open and closed positions, is in the closed position, the mobile device also including a first display screen configured such that the first display screen is not viewable while the mobile device is in the closed position; and
  facilitating an automatic updating of the subset of images displayed in response to the occurrence of one or more events, wherein the occurrence of one or more events includes determining that the location associated with the most recently captured image differs from a location associated with a previously captured image.

14. The method of claim 13 further comprising:
  enabling selection from one or more modes of operation of the mobile device, said modes comprising at least a review mode.

15. The method of claim 14, wherein facilitating the displaying of the subset of images selected comprises facilitating an automatic displaying of the subset of images in response to selection of the review mode.

16. The method of claim 13 further comprising:
  enabling definition of the subset of images displayed on the second display screen, such that selecting a subset of the plurality of images captured comprises selecting the subset of images based at least in part on a definition of the subset.

17. The method of claim 13, wherein respective images of the plurality of images captured have a corresponding date and time associated therewith.

18. The method of claim 13, wherein facilitating the automatic updating of the subset of images displayed in response to the occurrence of one or more events comprises facilitating the automatic updating of the subset of images where a location associated with a latest image captured differs from a location associated with a previously captured image, such that all images of the subset of images displayed have the same corresponding location associated therewith.

19. The method of claim 13, wherein facilitating the automatic updating of the subset of images displayed in response to the occurrence of one or more events comprises replacing the oldest image captured with a newly captured image when a number of images in the subset reaches a predefined limit.

20. The method of claim 13, wherein facilitating the capturing of the plurality of images includes facilitating the capturing of the plurality of images while the mobile device is in the closed position.

21. A computer program product comprising at least one computer-readable memory having computer-readable program code portions stored therein, said computer-readable program code portions comprising:
  a first executable portion for selecting a subset of a plurality of images captured, the subset being defined as images captured at a location associated with a most recently captured image as indicated by a positioning system;
  a second executable portion for facilitating an automatic displaying of the subset of images selected on a second display screen of a mobile device, that is configured to alternatively assume open and closed positions, while the mobile device is in the closed position, the mobile device also including a first display screen configured such that the first display screen is not viewable while the mobile device is in the closed position; and
  a third executable portion for facilitating an automatic updating of the subset of images displayed in response to the occurrence of one or more events, wherein the occurrence of one or more events includes determining that the location associated with the most recently captured image differs from a location associated with a previously captured image.

22. The computer program product of claim 21, wherein the computer-readable program code portions further comprise:
  a fourth executable portion for enabling selection from one or more modes of operation of the mobile device, said modes comprising at least a review mode.

23. The computer program product of claim 22, wherein facilitating the automatic displaying of the subset of images selected comprises facilitating the automatic displaying of the subset of images in response to selection of the review mode.

24. The computer program product of claim 21, wherein the computer-readable program code portions further comprise:
  a fourth executable portion for enabling definition of the subset of images displayed on the display screen, such that selecting a subset of the plurality of images captured comprises selecting the subset of images based at least in part on a definition of the subset.

25. The computer program product of claim 21, wherein respective images of the plurality of images captured have a corresponding date and time associated therewith.

26. The computer program product of claim 21, wherein facilitating the automatic updating of the subset of images displayed in response to the occurrence of one or more events comprises facilitating the automatic updating of the subset of images where a location associated with a latest image captured differs from a location associated with a previously captured image, such that all images of the subset of images displayed have the same corresponding location associated therewith.

27. The computer program product of claim 21, wherein facilitating the automatic updating of the subset of images displayed in response to one or more events occurring comprises replacing the oldest image captured with a newly captured image when a number of images in the subset reaches a predefined limit.

28. An apparatus comprising at least one processor and at least one memory including computer program code, the at least one memory and the computer program code configured to, with the at least one processor, cause the apparatus at least to:
select a subset of images from a plurality of images captured, the subset being defined as images captured at a location associated with a most recently captured image as indicated by a positioning system;
facilitate displaying of the subset of images selected on a second display screen of a mobile device, that is configured to alternatively assume open and closed positions, while the mobile device is in the closed position, the mobile device also including a first display screen configured such that the first display screen is not viewable while the mobile device is in the closed position; and
facilitate automatically updating the subset of images displayed in response to the occurrence of one or more events, wherein the occurrence of one or more events includes determining that the location associated with the most recently captured image differs from a location associated with a previously captured image.

29. The apparatus of claim 28, wherein the apparatus is further caused to enable definition of the subset of images, such that selecting the subset of images from the plurality of images comprises selecting based at least in part on a definition of the subset.

30. The apparatus of claim 28, wherein the apparatus is the mobile device; and wherein the second display screen is configured to be viewable while the apparatus is closed.

31. The apparatus of claim 28, wherein respective images of the plurality of images captured have a corresponding date and time associated therewith.

32. The apparatus of claim 28, wherein respective images of the plurality of images captured have a corresponding location associated therewith, and wherein the apparatus is further caused to facilitate automatically updating the subset of images displayed where a location associated with a latest image captured differs from a location associated with a previously captured image, such that all images of the subset of images displayed have the same corresponding location associated therewith.

33. The apparatus of claim 28, wherein the apparatus caused to facilitate automatically updating the subset of images displayed in response to the occurrence of one or more events comprises being caused to replace the oldest image captured with a newly captured image when a number of images in the subset reaches a predefined limit.

34. The apparatus of claim 28 further comprising a camera configured to capture the plurality of images.

35. An apparatus comprising:
a means for selecting a subset of images from a plurality of images captured, the subset being defined as images captured at a location associated with a most recently captured image as indicated by a positioning system;
a means for facilitating a displaying of the selected subset of images on a second display screen of a mobile device, that is configured to alternatively assume open and closed positions, while the mobile device is in the closed position, the mobile device also including a first display screen configured such that the first display screen is not viewable while the mobile device is in the closed position; and
a means for facilitating an automatic updating of the subset of images displayed in response to the occurrence of one or more events, wherein the occurrence of one or more events includes determining that the location associated with the most recently captured image differs from a location associated with a previously captured image.

36. The apparatus of claim 35 further comprising:
a means for enabling definition of the subset of images, such that selecting the subset of images from the plurality of images comprises selecting based at least in part on a definition of the subset.

37. The apparatus of claim 35, wherein respective images of the plurality of images captured have a corresponding date and time associated therewith.

38. The apparatus of claim 35, wherein the means for facilitating the automatic updating of the subset of images displayed comprises a means for facilitating an automatic updating of the subset of images where a location associated with a latest image captured differs from a location associated with a previously captured image, such that all images of the subset of images displayed have the same corresponding location associated therewith.

39. The apparatus of claim 35, wherein the means for facilitating the automatic updating of the subset of images displayed in response to the occurrence of one or more events comprises a means for replacing the oldest image captured with a newly captured image when a number of images in the subset reaches a predefined limit.

* * * * *